(12) United States Patent
Yang et al.

(10) Patent No.: US 11,674,804 B2
(45) Date of Patent: Jun. 13, 2023

(54) MEMS GYROSCOPE AND ELECTRONIC DEVICE USING SAME (71) Applicants: AAC Kaitai Technologies (Wuhan) CO., LTD, Hubei (CN); AAC ACOUSTIC TECHNOLOGIES (SHENZHEN) CO., LTD., Shenzhen (CN)

(72) Inventors: Shan Yang, Shenzhen (CN); Zhan Zhan, Shenzhen (CN); Hongtao Peng, Shenzhen (CN); Zhao Ma, Shenzhen (CN); Xiao Kan, Shenzhen (CN); Yang Li, Shenzhen (CN); Kahkeen Lai, Singapore (SG); Yan Hong, Shenzhen (CN); Veronica Tan, Singapore (SG)

(73) Assignees: AAC KAITAI TECHNOLOGIES (WUHAN) CO., LTD, Wuhan (CN); AAC Acoustic Technologies (Shenzhen) Co., Ltd., Shenzhen (CN)

( * ) Notice: Subject to any disclaimer, the term of this patent is extended or adjusted under 35 U.S.C. 154(b) by 7 days.

(21) Appl. No.: 17/566,733

(22) Filed: Dec. 31, 2021

(65) Prior Publication Data

US 2023/0130249 A1    Apr. 27, 2023

(30) Foreign Application Priority Data

Oct. 25, 2021 (CN) .......................... 202122573095.4

(51) Int. Cl.
*G01C 19/5712* (2012.01)

(52) U.S. Cl.
CPC .................. *G01C 19/5712* (2013.01)

(58) Field of Classification Search
CPC .................................................. G01C 19/5712
See application file for complete search history.

(56) References Cited

U.S. PATENT DOCUMENTS

2017/0314960 A1* 11/2017 Anac ..................... G01C 25/005
2019/0178645 A1* 6/2019 Senkal ............... G01C 19/5712
2019/0277656 A1* 9/2019 Painter ................. G01C 25/005

* cited by examiner

*Primary Examiner* — David J Bolduc
(74) *Attorney, Agent, or Firm* — W&G Law Group (57) ABSTRACT

The present invention provides a MEMS gyroscope having internal coupling beam, an external coupling beam, a drive structure and a detection structure. The drive structure includes multiple driving weights, and the detection structure includes multiple testing weights. The drive structure further includes a first decoupling structure and a first transducer. The first decoupling structure is arranged on the side of the driving weight far away from the internal coupling beam, and the first transducer excites the driving weight to vibrate. The MEMS gyroscope of the present invention can fully increase the layout area of the first transducer, thereby realizing a larger vibration amplitude under a small driving voltage, thereby increasing the sensitivity.

11 Claims, 6 Drawing Sheets

MEMS GYROSCOPE AND ELECTRONIC DEVICE USING SAME

FIELD OF THE PRESENT DISCLOSURE

The present invention relates to the technical field of electronic components, and specifically relates to a MEMS gyroscope and electronic device using such a MEMS groscope.

DESCRIPTION OF RELATED ART

MEMS gyroscope is a miniature angular velocity sensor made by micro-machining technology and micro-electronic technology. Typical structures include tuning fork type, ring type, nested ring type, disc, hemispherical gyroscope, etc. The MEMS mass distributed gyroscope is a new type of gyroscope, and this type of gyroscope has the same degenerate mode as the MEMS ring gyroscope. Thus, it has a highly symmetrical driving and detection mode, and the magnitude of the angular velocity input is calculated by the energy of the detection mode.

Traditional MEMS gyroscope has shortcomings such as small drive/detection capacitance and low Coriolis gain.

In view of the above problems, it is necessary to provide a MEMS gyroscope and electronic device that is reasonably designed and can effectively improve the above problems.

SUMMARY OF THE PRESENT INVENTION

The purpose of the present invention is to provide a MEMS gyroscope, with improved sensitivity and reduced quadrature error.

To achieve the above-mentioned objects, the present invention provides a MEMS gyroscope, including: an internal coupling beam; an external coupling beam; a drive structure including multiple driving weights vibrating along a first vibration shaft or a second vibration shaft under a driving mode status; a detection structure alternately arranged on outside of the internal coupling beam, and having multiple testing weights vibrating along a third vibration shaft or a fourth vibration shaft in a detection mode; an external anchor mechanically coupled with the drive structure; an internal anchor mechanically coupled with the detection structure; a first decoupling structure connecting the driving weight to the external anchor, and being arranged on a side of the driving weight away from the internal coupling beam; and a first transducer provided on the first decoupling structure for exciting the driving weight to vibrate. One end of the driving weight and the testing weight is connected to the internal coupling beam, the other end of the driving weight and the testing weight is connected by the external coupling beam.

In addition, a mass of the test weight is smaller than a mass of the driving weight.

In addition, the drive structure and the detection structure are coupled in a solid wave manner; the internal coupling beam and the external coupling beam both undergo elasticity deformation in the driving/detecting mode.

In addition, the first decoupling structure includes a first elastic member connecting the driving weight and the first decoupling structure, and a second elastic member connecting the first decoupling structure and the external anchor.

In addition, the first elastic member is configured to have a greatest stiffness along a vibration direction of the driving weight in the driving mode status, and to have largest elasticity perpendicular to the vibration direction of the driving weight in the driving mode status; the second elastic member is configured to have the greatest elasticity along the vibration direction of the driving weight in the driving mode status, and to have the greatest stiffness in the vibration direction perpendicular to the driving weight in the driving mode status.

In addition, the detection structure further includes a second decoupling structure connecting the test weight and the internal anchor; the second decoupling structure is inside the test weight; the second decoupling structure is a frame structure that matches the inside of the test weight.

In addition, the detection structure further includes a second transducer arranged inside the second decoupling structure; the second transducer detects the displacement of the vibration of the test weight.

In addition, the second decoupling structure includes a third elastic member connecting the test weight and the second decoupling structure, and a fourth elastic member connecting the second decoupling structure and the internal anchor.

In addition, the third elastic member is configured to have the greatest stiffness along the test weight in the direction of vibration in the test mode, and to have the largest elasticity perpendicular to the vibration direction of the test weight in the detection mode; the fourth elastic member is configured to have the largest elasticity along the vibration direction of the testing weight in the detection mode, and to have the greatest stiffness in the vibration direction perpendicular to the test weight in the test mode.

In addition, the first vibration shaft, the second vibration shaft, the third vibration shaft, and the fourth vibration shaft are located in a same vibration plane; the first vibration shaft and the second vibration shaft are arranged orthogonally; the third vibration shaft and the fourth vibration shaft are arranged orthogonally; and the third vibration shaft and the adjacent first vibration shaft or second vibration shaft form an angle of 45°.

The present invention further provides an electronic device including a MEMS gyroscope as described above.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

As shown in FIGS. 1-4, one aspect of the present invention provides a MEMS gyroscope 100, which includes an internal coupling beam 110, an external coupling beam 120, a driving structure 130 and a detecting structure 140 which are alternately arranged on the outer side of the internal coupling beam 110, an outer anchor point 150 fixing the driving structure 130, and an internal anchor points 160 for fixing multiple groups of detection structures 140.

Figure 1:
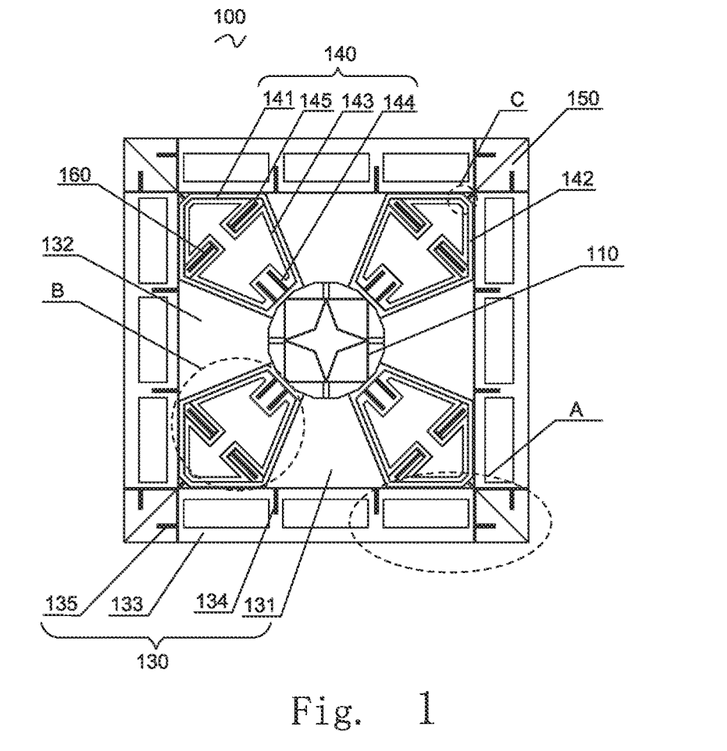
FIG. 1 is a top view of a MEMS gyroscope in accordance with an embodiment of the present invention.
Figure 5A:
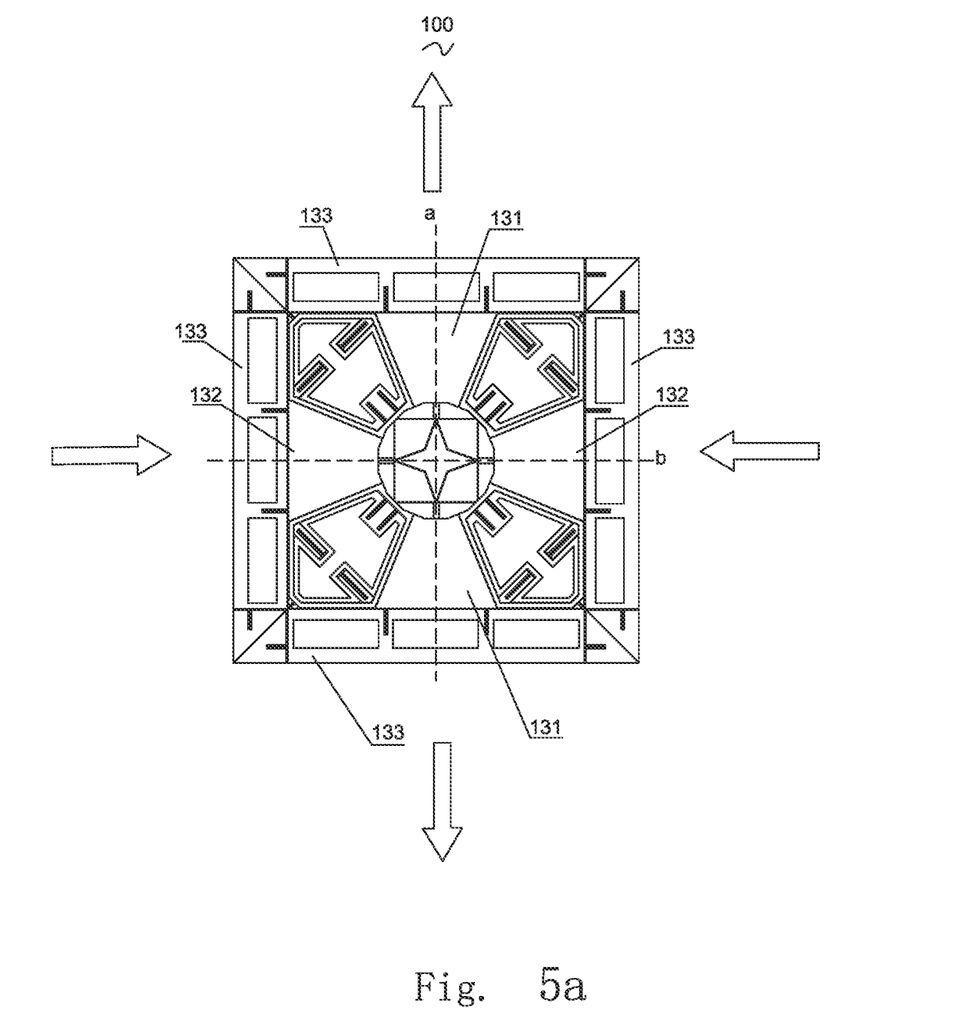
FIG. 5a illustrates a vibration direction of a driving weight of the MEMS gyroscope in a driving mode status.

As shown in FIG. 1 and FIG. 5a, the drive structure 130 includes a first driving weight 131 vibrating along the first vibration shaft a and a second driving weight 132 vibrating along the second vibration shaft b in the driving mode status. The first driving weight 131 includes two symmetrically arranged with respect to the second vibration shaft b. The second driving weight 132 includes two symmetrically arranged with respect to the first vibration shaft a. It can be understood that, in other optional embodiments, the first driving weight 131 may be 2N symmetrically arranged about the second vibration shaft b. The second driving weight 132 may be 2N symmetrically arranged with respect to the first vibration shaft a. In the driving mode status of the MEMS gyroscope 100, the first driving weight 131 and the second driving weight 132 have the same vibration frequency and the phase difference between the two is 180 degrees. The drive structure 130 also includes a first decoupling structure 133 connecting the external anchor 150 and the first driving weight 131/second driving weight 132. Specifically, the first driving weight 131/second driving weight 132 is connected to the first decoupling structure 133 through the first elastic member 134. The first decoupling structure 133 is connected to the external anchor 150 through the second elastic member 135.

Figure 2:
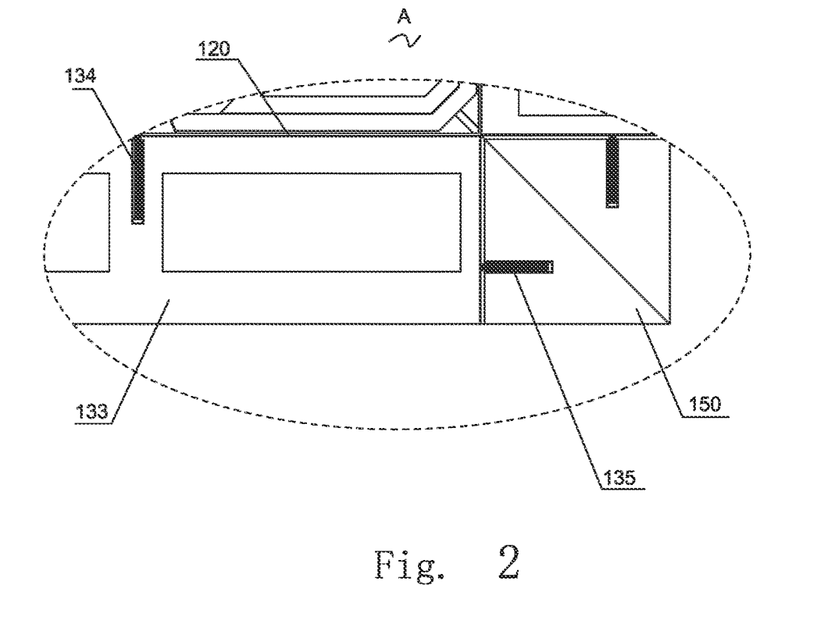
FIG. 2 is an enlarged view of part A in FIG. 1.

As shown in FIG. 2, the first elastic member 134 is configured to have the greatest stiffness along the vibration direction of the first driving weight 131/second driving weight 132 in the driving mode status. And it has the largest elasticity in the vibration direction perpendicular to the first driving weight 131/second driving weight 132 in the driving mode status. The second elastic member 135 is configured to have the largest elasticity in the vibration direction of the first driving weight 131/second driving weight 132 in the driving mode status. And it has the greatest stiffness in the vibration direction perpendicular to the driving weight in the driving mode status. With this arrangement, in the driving mode status of the MEMS gyroscope provided by the present invention, the first decoupling structure 133 can drive the first driving weight 131/second driving weight 132 to vibrate along the first vibration shaft a or the second vibration shaft. In the MEMS gyroscope detection mode, the first driving weight 131/second driving weight 132 realizes translational movement. At the same time, the first decoupling structure 133 does not move, so as to realize the movement decoupling of the decoupling structure. Its movement is not affected by the detection mode, which is conducive to the stable drive of the MEMS gyroscope.

The first decoupling structure 133 is arranged on the side of the first driving weight 131/second driving weight 132 far away from the internal coupling beam 110. A first transducer is provided on the first decoupling structure 133. The first transducer can be set to one or more combinations of capacitance, inductance, pyroelectric, and piezoelectric. The first transducer excites the first driving weight 131/the second driving weight 132 to vibrate. The first decoupling structure 133 is arranged outside the first driving weight 131/second driving weight 132, so the first transducer arranged on it can have a larger layout design area. This provides greater driving force, increases the driving amplitude, and improves the sensitivity of the MEMS gyroscope.

Figure 5B:
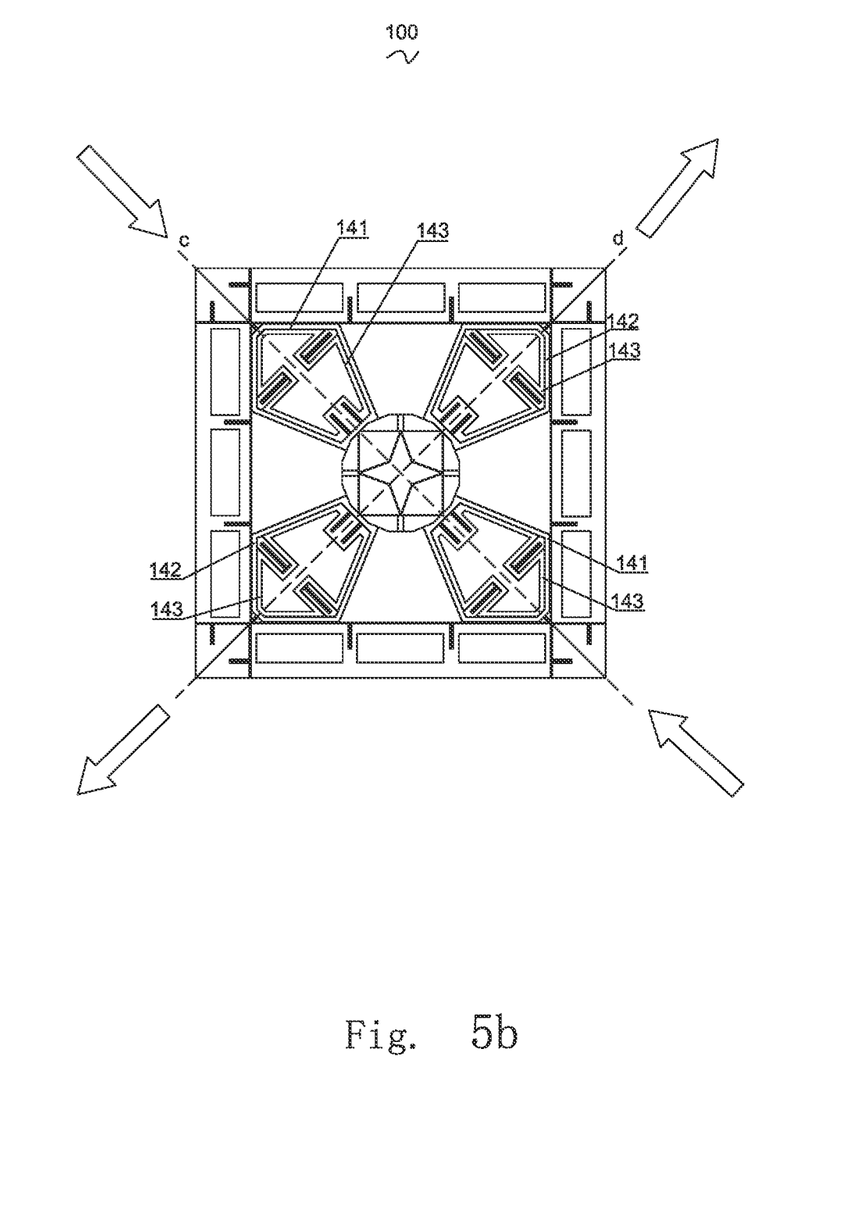
FIG. 5b illustrates a vibration direction of a testing weight of a MEMS gyroscope of the present invention in the testing mode.

As shown in FIG. 1 and FIG. 5b, the detection structure 140 includes a third testing weight 141 vibrating along the third vibration shaft c and a fourth testing weight 142 vibrating along the fourth vibration shaft d in the detection mode. The third testing weight 141 includes two symmetrically arranged relative to the fourth vibration shaft d. The fourth testing weight 142 includes two symmetrically arranged relative to the third vibration shaft c. It is understandable that in other optional embodiments, the third testing weight 141 may be set to 2N symmetrically set about the fourth vibration shaft d. The fourth testing weight 142 can be set to 2N symmetrically about the third vibration shaft c.

The first vibration shaft a, second vibration shaft b, third vibration shaft c, and fourth vibration shaft d are located in the same vibration plane. The first vibration shaft a and the second vibration shaft b are arranged orthogonally. The third vibration shaft c and the fourth vibration shaft d are arranged orthogonally. The third vibration shaft c forms an angle of 45° with the adjacent first vibration shaft a or second vibration shaft b.

The third testing weight 141/the fourth testing weight 142 is hollowed out inside. The second decoupling structure 143 that matches the shape of the third testing weight 141/fourth testing weight 142 is set inside. And the second decoupling structure 143 is provided with a second transducer for detecting displacement. This arrangement can increase the design area of the transducer for detecting displacement, thereby increasing the detection signal and improving the detection sensitivity of the MEMS gyroscope. Further, setting the testing weight in this way facilitates making the quality of the testing weight (third testing weight 141/fourth testing weight 142) smaller than the driving weight (first driving weight). This setting can greatly increase the Coriolis gain of the MEMS gyroscope and increase the sensitivity of the MEMS gyroscope.

The detection structure 140 also includes a second decoupling structure 143 set inside the hollow third testing weight 141/fourth testing weight 142. The second decoupling structure 143 is set to a frame structure that matches the inside of the third testing weight 141/fourth testing weight 142. The second decoupling structure 143 connects the third testing weight 141/fourth testing weight 142 and the internal anchor 160. As shown in FIG. 1, specifically, the second decoupling structure 143 includes a third elastic member 144 connecting the third testing weight 141/fourth testing weight 142 and the second decoupling structure 143, and a fourth elastic member 145 connecting the second decoupling structure 143 and the internal anchor 160.

Figure 3:
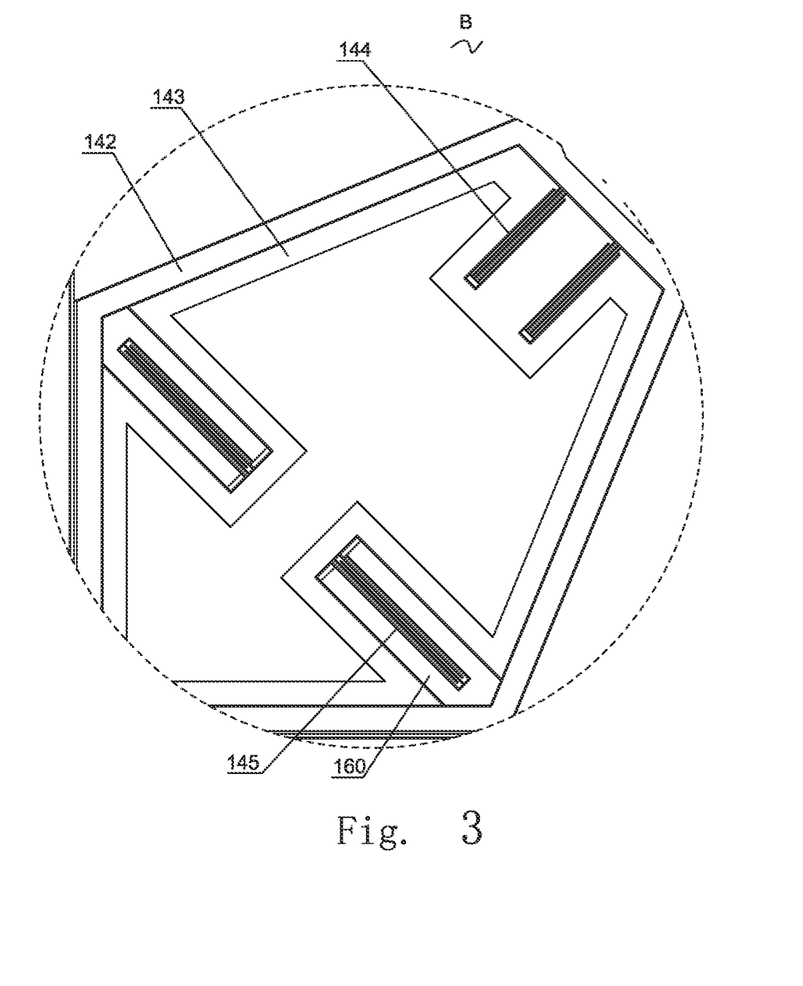
FIG. 3 is an enlarged view of part B in FIG. 1.
Figure 4:
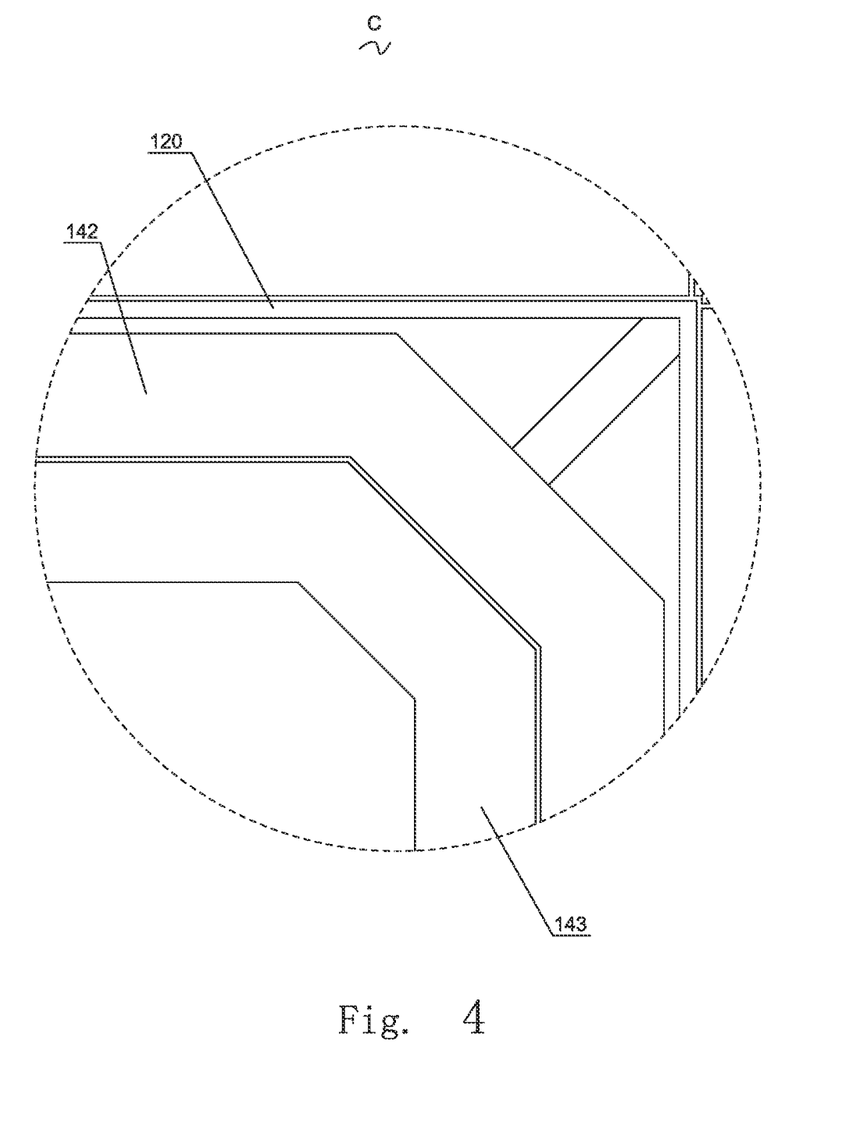
FIG. 4 is an enlarged view of part C in FIG. 1.

As shown in FIG. 3, the third elastic member 144 is configured to have the greatest stiffness along the vibration direction of the third testing weight 141/fourth testing weight 142 in the testing mode. And it has the largest elasticity in the vibration direction perpendicular to the third testing weight 141/fourth testing weight 142 in the testing mode. The fourth elastic member 145 is configured to have the largest elasticity along the vibration direction of the third testing weight 141/fourth testing weight 142 in the detection mode. And perpendicular to the third testing weight 141/fourth testing weight 142, it has the greatest stiffness in the vibration direction of the testing mode. With this setting, the second decoupling structure 143 will not be displaced when the third testing weight 141/fourth testing weight 142 is deflected under the driving mode status. Realize motion decoupling, thereby suppressing the quadrature error of MEMS gyroscope.

Figure 6:
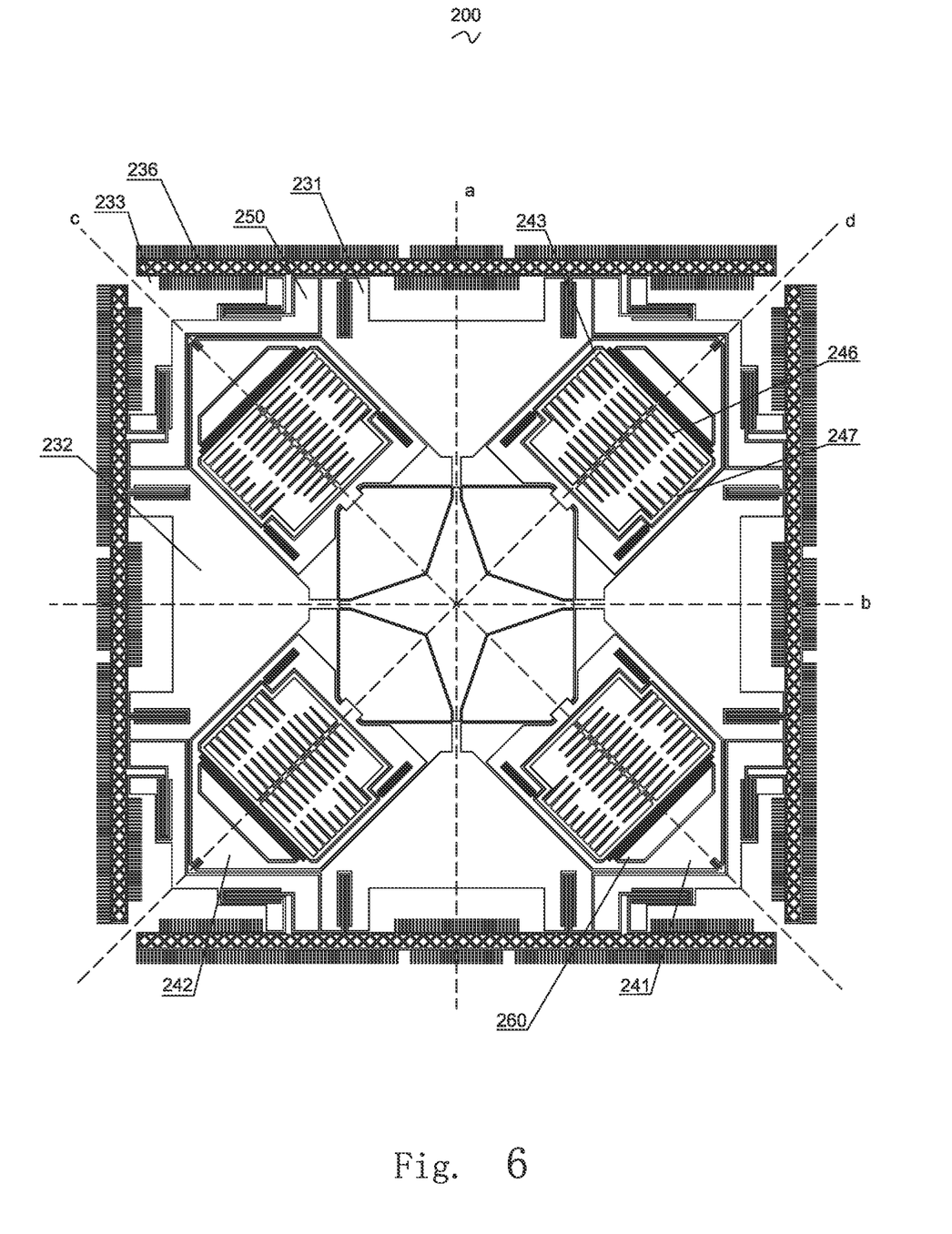
FIG. 6 is a top view of a MEMS gyroscope in accordance with another embodiment of the present invention.

FIG. 6 shows a MEMS gyroscope 200 of another embodiment provided by the present invention. The same as the above embodiment, it also includes driving weight (231/232) and testing weight (241/242) alternately set. The first decoupling structure 233 and the second decoupling structure 234 are mechanically coupled with the external anchor 250 and the internal anchor 260, respectively. As shown in FIG. 6, the first decoupling structure 233 is provided with a comb capacitor for driving the vibration of the driving weight (231/232) as the first transducer 236. The second decoupling structure 243 is provided with a plate capacitor for detecting displacement as the second transducer 246. In this embodiment, since the first decoupling structure 233 is arranged outside the driving weight (231/232), it is obvious that it has a larger design area for setting the comb capacitor. As a result, it brings greater vibration amplitude and greater Coriolis gain to the MEMS gyroscope 200. At the same time, the second decoupling structure 243 set inside the test weight (241/242) is beneficial to reduce the orthogonality error. The difference from the foregoing embodiment is that the second decoupling structure includes a pair of side edges 247 adjacent to the driving weight. The side edge 247 is arranged in parallel with the third vibration shaft c/fourth vibration shaft d. With this setting, the second decoupling structure 243 can have a more regular design area for arranging second transducers.

Another aspect of the present invention provides an electronic device, which includes the aforementioned MEMS gyroscope. The specific structure of the MEMS gyroscope has been described in detail above.

The MEMS gyroscope provided by the present invention is provided with a first decoupling structure on the side of the driving weight away from the internal coupling beam. And set the first transducer of driving weight vibration on the first decoupling structure. This setting allows the first transducer to have a larger layout area. In addition, a second decoupling structure is set inside the test weight, which is beneficial to reduce the orthogonal error. In addition, by setting the drive quality and inspection quality asymmetrically, the Coriolis gain can be effectively increased. Compared with the prior art, the MEMS gyroscope provided by the present invention can provide a larger vibration amplitude and a larger Coriolis gain. Thus, the sensitivity of the MEMS gyroscope is improved, and the quadrature error is effectively reduced. In addition, the drive structure and detection structure are coupled by solid wave mode. The inner and outer coupled beams undergo elasticity deformation in both driving and detecting modes. The machining error has an influence on the frequency of the driving mode status as well as the frequency of the detection mode, so as to ensure the frequency difference between the two modes.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A MEMS gyroscope, including:
    an internal coupling beam;
    an external coupling beam;
    a drive structure including multiple driving weights vibrating along a first vibration shaft or a second vibration shaft under a driving mode status;
    a detection structure alternately arranged on outside of the internal coupling beam, and having multiple testing weights vibrating along a third vibration shaft or a fourth vibration shaft in a detection mode;
    an external anchor mechanically coupled with the drive structure;
    an internal anchor mechanically coupled with the detection structure;
    a first decoupling structure connecting the driving weight to the external anchor, and being arranged on a side of the driving weight away from the internal coupling beam;
    a first transducer provided on the first decoupling structure for exciting the driving weight to vibrate; wherein
    one end of the driving weight and the testing weight is connected to the internal coupling beam, the other end of the driving weight and the testing weight is connected by the external coupling beam.

2. The MEMS gyroscope as described in claim 1, wherein a mass of the test weight is smaller than a mass of the driving weight.

3. The MEMS gyroscope as described in claim 1, wherein the drive structure and the detection structure are coupled in a solid wave manner; the internal coupling beam and the external coupling beam both undergo elasticity deformation in the driving/detecting mode.

4. The MEMS gyroscope as described in claim 1, wherein the first decoupling structure includes a first elastic member connecting the driving weight and the first decoupling structure, and a second elastic member connecting the first decoupling structure and the external anchor.

5. The MEMS gyroscope as described in claim 4, wherein the first elastic member is configured to have a greatest stiffness along a vibration direction of the driving weight in the driving mode status, and to have largest elasticity perpendicular to the vibration direction of the driving weight in the driving mode status; the second elastic member is configured to have the greatest elasticity along the vibration direction of the driving weight in the driving mode status, and to have the greatest stiffness in the vibration direction perpendicular to the driving weight in the driving mode status.

6. The MEMS gyroscope as described in claim 1, wherein the detection structure further includes a second decoupling structure connecting the test weight and the internal anchor; the second decoupling structure is inside the test weight; the second decoupling structure is a frame structure that matches the inside of the test weight.

7. The MEMS gyroscope as described in claim 6, wherein the detection structure further includes a second transducer arranged inside the second decoupling structure; the second transducer detects the displacement of the vibration of the test weight.

8. The MEMS gyroscope as described in claim 6, wherein the second decoupling structure includes a third elastic member connecting the test weight and the second decoupling structure, and a fourth elastic member connecting the second decoupling structure and the internal anchor.

9. The MEMS gyroscope as described in claim 8, wherein the third elastic member is configured to have the greatest stiffness along the test weight in the direction of vibration in the test mode, and to have the largest elasticity perpendicular to the vibration direction of the test weight in the detection mode; the fourth elastic member is configured to have the largest elasticity along the vibration direction of the testing weight in the detection mode, and to have the greatest stiffness in the vibration direction perpendicular to the test weight in the test mode.

10. The MEMS gyroscope as described in claim 1, wherein the first vibration shaft, the second vibration shaft, the third vibration shaft, and the fourth vibration shaft are located in a same vibration plane;
   the first vibration shaft and the second vibration shaft are arranged orthogonally;
   the third vibration shaft and the fourth vibration shaft are arranged orthogonally; and
   the third vibration shaft and the adjacent first vibration shaft or second vibration shaft form an angle of 45°.

11. An electronic device including a MEMS gyroscope as described in claim 1.

* * * * *